(12) United States Patent
Chen et al.

(10) Patent No.: US 12,112,759 B2
(45) Date of Patent: Oct. 8, 2024

(54) SPEAKER DIARIZATION WITH EARLY-STOP CLUSTERING

(71) Applicant: Microsoft Technology Licensing, LLC, Redmond, WA (US)

(72) Inventors: Liping Chen, Redmond, WA (US); Kao-Ping Soong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 17/432,454

(22) PCT Filed: Mar. 29, 2019

(86) PCT No.: PCT/CN2019/080617
§ 371 (c)(1),
(2) Date: Aug. 19, 2021

(87) PCT Pub. No.: WO2020/199013
PCT Pub. Date: Oct. 8, 2020

(65) Prior Publication Data
US 2022/0122615 A1     Apr. 21, 2022

(51) Int. Cl.
*G10L 17/16*     (2013.01)
*G10L 17/02*     (2013.01)
(Continued)

(52) U.S. Cl.
CPC .............. *G10L 17/16* (2013.01); *G10L 17/02* (2013.01); *G10L 17/06* (2013.01); *G10L 17/18* (2013.01); *G10L 21/028* (2013.01)

(58) Field of Classification Search
CPC ......... G10L 17/16; G10L 17/02; G10L 17/06; G10L 17/18; G10L 21/028
See application file for complete search history.

(56) References Cited

U.S. PATENT DOCUMENTS

| 2011/0119060 A1 | 5/2011 | Aronowitz |
| 2014/0074467 A1* | 3/2014 | Ziv ......................... G10L 25/51 704/235 |

(Continued)

FOREIGN PATENT DOCUMENTS

| CN | 103531198 A | 1/2014 |
| CN | 107358945 A | 11/2017 |
| CN | 109065028 A | 12/2018 |

OTHER PUBLICATIONS

"First Office Action and Search Report Issued in Chinese Patent Application No. 201980035652.X", Mailed Date: Jun. 30, 2023, 6 Pages.

(Continued)

*Primary Examiner* — Daniel C Washburn
*Assistant Examiner* — Paul J. Mueller
(74) *Attorney, Agent, or Firm* — Schwegman Lundberg & Woessner, P.A.

(57) ABSTRACT

A method and apparatus for speaker diarization with early-stop clustering, segmenting an audio stream into at least one speech segment (710), the audio stream comprising speeches from at least one speaker; clustering the at least one speech segment into a plurality of clusters (720), the number of the plurality of clusters being greater than the number of the at least one speaker; selecting, from the plurality of clusters, at least one cluster of the highest similarity (730), the number of the selected at least one cluster being equal to the number of the at least one speaker; establishing a speaker classification model based on the selected at least one cluster (740); and aligning, through the speaker classification model, speech frames in the audio stream to the at least one speaker (750).

17 Claims, 8 Drawing Sheets

(51) Int. Cl.
  G10L 17/06   (2013.01)
  G10L 17/18   (2013.01)
  G10L 21/028  (2013.01)

(56) References Cited

U.S. PATENT DOCUMENTS

| | | | | |
|---|---|---|---|---|
| 2014/0180689 | A1* | 6/2014 | Kim | G10L 15/32 |
| | | | | 704/246 |
| 2014/0337027 | A1* | 11/2014 | Ide | G10L 17/14 |
| | | | | 704/245 |
| 2014/0358541 | A1* | 12/2014 | Colibro | G10L 15/063 |
| | | | | 704/245 |
| 2015/0025887 | A1 | 1/2015 | Sidi et al. | |
| 2018/0158464 | A1 | 6/2018 | Sidi et al. | |
| 2018/0233125 | A1* | 8/2018 | Mitchell | G10L 25/78 |
| 2019/0377818 | A1* | 12/2019 | Andritsos | G06F 16/2465 |
| 2019/0385697 | A1* | 12/2019 | Dowell-Deen | G16B 5/00 |
| 2020/0321008 | A1* | 10/2020 | Wang | G06F 21/32 |
| 2021/0217404 | A1* | 7/2021 | Jia | G10L 25/30 |

OTHER PUBLICATIONS

"Decision To Grant Issued in European Patent Application No. 19923397.4", Mailed Date: Jun. 22, 2023, 2 Pages.
Bishop, Christopher M., "Pattern Recognition and Machine Learning", In Publication of Springer, Aug. 2006, 758 Pages.
Chen, et al., "Speaker, Environment and Channel Change Detection and Clustering via the Bayesian Information Criterion", In Proceedings of the DARPA Broadcast News Transcription and Understanding Workshop, Feb. 8, 1998, 6 Pages.
Dehak, et al., "Front End Factor Analysis for Speaker Verification", In Journal of IEEE Transactions on Audio, Speech and Language Processing, vol. 19, Issue 4, Aug. 9, 2010, pp. 788-798.
Diez, et al., "Speaker Diarization Based on Bayesian HMM with Eigenvoice Priors", In Proceedings of the Odyssey the Speaker and Language Recognition Workshop, Jun. 26, 2018, pp. 147-154.
Garcia-Romero, et al., "Speaker Diarization using Deep Neural Network Embeddings", In Proceedings of the IEEE International Conference on Acoustics, Speech and Signal Processing, Mar. 5, 2017, pp. 4930-4934.
Gupta, Vishwa, "Speaker Change Point Detection using Deep Neural Nets", In Proceedings of IEEE International Conference on Acoustics, Speech and Signal Processing, Apr. 19, 2015, pp. 4420-4424.
Hruz, et al., "Convolutional Neural Network for Speaker Change Detection in Telephone Speaker Diarization System", In Proceedings of the IEEE International Conference on Acoustics, Speech and Signal Processing, Mar. 5, 2017, pp. 4945-4949.
Jiang, et al., "PLDA Modeling in i-Vector and Supervector Space for Speaker Verification", In Proceedings of the Annual Conference of the International Speech Communication Association, Sep. 2, 2012, 4 Pages.
Kenny, Patrick, "Bayesian Analysis of Speaker Diarization with Eigenvoice Priors", In Technical Report of Computer Research Institute of Montreal, Dec. 11, 2008, 18 Pages.
Kenny, et al., "Diarization of Telephone Conversations using Factor Analysis", In IEEE Journal of Selected Topics in Signal Processing, vol. 4, Issue 6, Sep. 30, 2010, pp. 1059-1070.
Miro, et al., "Speaker Diarization: A Review of Recent Research", In Journal of IEEE Transactions on Audio, Speech, and Language Processing, vol. 20, Issue 2, Jan. 23, 2012, pp. 356-370.

Nagrani, et al., "VoxCeleb: A Large-Scale Speaker Identification Dataset", In Publication of Interspeech, Aug. 20, 2017, pp. 2616-2620.
Parra, et al., "Blind Source Separation via Generalized Eigenvalue Decomposition", In Journal of Machine Learning Research, vol. 4, Dec. 1, 2003, pp. 1261-1269.
"International Search Report and Written Opinion Issued in PCT Application No. PCT/CN2019/080617", Mailed Date: Dec. 30, 2019, 10 Pages.
Povey, et al., "The Kaldi Speech Recognition Toolkit", In Proceedings of the IEEE Workshop on Automatic Speech Recognition and Understanding, Dec. 11, 2011, 4 Pages.
Prince, et al., "Probabilistic Linear Discriminant Analysis for Inferences About Identity", In Proceedings of the IEEE 11th International Conference on Computer Vision, Oct. 14, 2007, 8 Pages.
Rougui, et al., "Fast Incremental Clustering of Gaussian Mixture Speaker Models for Scaling up Retrieval in On-Line Broadcast", In Proceedings of the IEEE International Conference on Acoustics Speech and Signal Processing, May 14, 2006, pp. 521-524.
Sell, et al., "Speaker Diarization with PLDA i-Vector Scoring and Unsupervised Calibration", In Proceedings of the IEEE Spoken Language Technology Workshop (SLT), Dec. 7, 2014, pp. 413-417.
Siegler, et al., "Automatic Segmentation, Classification and Clustering of Broadcast News Audio", In Proceedings of the DARPA Speech Recognition Workshop, Feb. 2, 1997, 3 Pages.
Snyder, et al., "Deep Neural Network Embeddings for Text-Independent Speaker Verification", In Publication of Interspeech, Aug. 20, 2017, pp. 999-1003.
Soldi, et al., "Adaptive and Online Speaker Diarization for Meeting Data", In Proceedings of the 23rd European Signal Processing Conference, Aug. 31, 2015, pp. 2112-2116.
Tsai, et al., "Speaker Clustering of Speech Utterances using a Voice Characteristic Reference Space", In Proceedings of the 8th International Conference on Spoken Language Processing, Oct. 4, 2004, 4 Pages.
Variani, et al., "Deep Neural Networks for Small Footprint Text-Dependent Speaker Verification", In Proceedings of the IEEE International Conference on Acoustics, Speech and Signal Processing, May 4, 2014, pp. 4052-4056.
Wang, et al., "Speaker Diarization with LSTM", In Proceedings of the IEEE International Conference on Acoustics, Speech and Signal Processing, Apr. 15, 2018, pp. 5239-5243.
Yin, et al., "Speaker Change Detection in Broadcast TV using Bidirectional Long Short-Term Memory Networks", In Publication of Interspeech, Aug. 20, 2017, pp. 3827-3831.
"Extended European Search Report Issued in European Patent Application No. 19923397.4", Mailed Date: Oct. 17, 2022, 4 Pages.
Anguera, et al., "Purity Algorithms for Speaker Diarization of Meetings Data", In Proceedings of IEEE International Conference on Acoustics Speech and Signal Processing Proceedings, May 14, 2006, pp. 11025-11028.
Paula, et al., "A Novel Method for Selecting the Number of Clusters in a Speaker Diarization System", In Proceedings of 22nd European Signal Processing Conference, Sep. 1, 2014, pp. 656-660.
"Notice of Allowance Issued in European Patent Application No. 19923397.4", Mailed Date: Mar. 22, 2023, 8 Pages.
Office Action Received for Chinese Application No. 201980035652.X, mailed on Nov. 16, 2023, 08 pages (English Translation Provided).
Communication pursuant to Rules 70(2) and 70a(2) Received in European patent application No. 19923397.4 Mailed Date: Nov. 4, 2022, 1 Page.

* cited by examiner

SPEAKER DIARIZATION WITH EARLY-STOP CLUSTERING

CROSS-REFERENCE TO RELATED APPLICATION

This application is a U.S. National Stage Filing under 35 U.S.C. 371 of International Patent Application Serial No. PCT/CN2019/080617, filed Mar. 29, 2019, and published as WO 2020/199013 A1 on Oct. 8, 2020, which application and publication are incorporated herein by reference in its entirety.

BACKGROUND

Speaker diarization is a process of partitioning an input audio stream into a number of portions corresponding to different speakers respectively. Speaker diarization aims to determine "who spoke when?" within an audio stream, and time intervals during which each speaker is active. Through applying speaker diarization to an audio stream involving speeches from multiple speakers, it may be determined that each speech utterance in the audio stream is spoken by which speaker, or what speech utterances have been spoken by each speaker. Speaker diarization is widely used in various scenarios. For example, for an audio stream from a meeting, speaker diarization may be used for automatically generating a meeting note which records speech utterances during the meeting and identifies a speaker for each speech utterance.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for speaker diarization with early-stop clustering. An audio stream may be segmented into at least one speech segment, the audio stream comprising speeches from at least one speaker. The at least one speech segment may be clustered into a plurality of clusters, the number of the plurality of clusters being greater than the number of the at least one speaker. At least one cluster of the highest similarity may be selected from the plurality of clusters, the number of the selected at least one cluster being equal to the number of the at least one speaker. A speaker classification model may be established based on the selected at least one cluster. Speech frames in the audio stream may be aligned to the at least one speaker through the speaker classification model.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, speaker diarization is implemented through speech segmentation and speech clustering. The speech segmentation may segment an audio stream into a plurality of speech segments through detecting speaker change points in the audio stream. The speech clustering may group the speech segments together on the basis of speaker characteristics, e.g., group possible speech segments from the same speaker into a cluster. According to traditional speaker diarization, the speech clustering is always stopped when the number of the clusters reaches the number of speakers. The number of speakers may be already known or estimated. In some cases, the clusters may be further used for establishing or initializing a speaker classification model, e.g., a hidden Markov model (HMM), for refining frame alignment between the audio stream and the speakers. Since it is possible to miss or fail to detect some speaker change points during the speech segmentation. e.g., a speech segment may comprise speech utterances from different speakers, the resulted clusters will sometimes be impure in terms of speakers accordingly, e.g., a cluster may comprise speech utterances or speech segments from different speakers, thus reducing accuracy of speaker diarization. Moreover, the speaker classification model established based on such impure clusters would further result in inaccurate frame alignment.

Embodiments of the present disclosure propose an improved speaker diarization with early-stop clustering. Herein, early-stop clustering may refer to, during the speaker diarization, stopping the clustering of speech segments before the number of the resulted clusters reaches the number of speakers. That is, the early-stop clustering aims to result in more clusters than the number of speakers. This may avoid generating impure clusters resulted if the clustering is further performed until the number of clusters reaches the number of speakers, and thus facilitate to generate purer clusters in terms of speakers as compared with the clustering operation in the traditional speaker diarization.

According to the embodiments of the present disclosure, the speaker diarization may further comprise selecting a plurality of clusters from the clusters generated through the early-stop clustering, wherein the number of the selected clusters corresponds to the number of speakers. The selected clusters may be then used for establishing or initializing a speaker classification model. Since the selected clusters may be those clusters of the highest similarity among the clusters generated through the early-stop clustering, this may ensure that the speaker classification model can be established with high-quality or high-pureness clusters, rather than being influenced by impure clusters. Accordingly, the established speaker classification model may possess a higher performance for frame alignment.

Further, the embodiments of the present disclosure also propose a new approach for estimating the number of speakers with a higher accuracy, which is applied in the early-stop clustering in the case that the number of speakers is unknown. Moreover, the embodiments of the present disclosure propose to utilize speaker bottleneck features across the process of speaker diarization, instead of utilizing speaker acoustic features, so as to better extract and represent speaker characteristics.

The speaker diarization with early-stop clustering according to the embodiments of the present disclosure may have a better system performance than the traditional speaker diarization, e.g., a lower diarization error rate (DER), a higher accuracy in estimating the number of speakers, etc.

Figure 1:
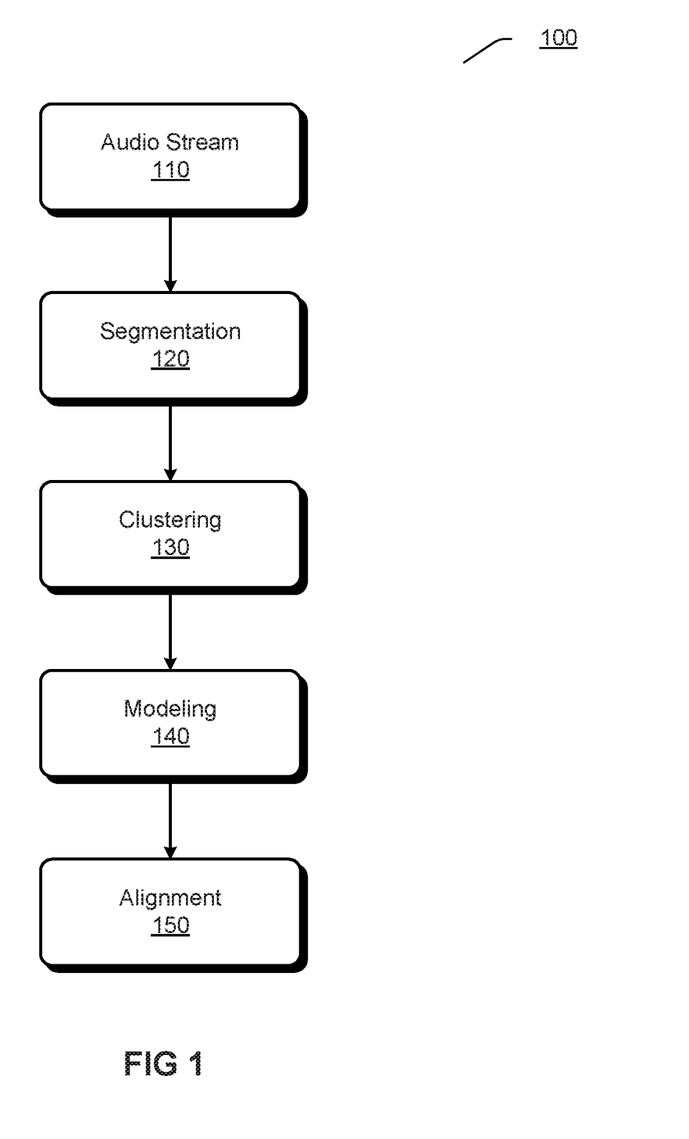
FIG. 1 illustrates an exemplary process of traditional speaker diarization.

FIG. 1 illustrates an exemplary process 100 of traditional speaker diarization.

At 110, an audio stream may be obtained. The audio stream may comprise speeches from at least one speaker. For example, the audio stream may be an audio record from a meeting involving at least one attendee, a dialogue from a movie involving at least one actor, etc.

At 120, speech segmentation may be performed on the audio stream. The speech segmentation may try to segment the audio stream into a plurality of speaker homogeneous speech segments. Each speech segment may comprise one or more speech frames. Usually, the speech segmentation may adopt speaker change point detection techniques for detecting speaker change points in the audio stream, and temporally segment the audio stream into a plurality of speech segments based on the speaker change points, wherein each speech segment intends to contain speech utterances of a single speaker. Alternatively, the speech segmentation may also split the audio stream into speech segments of a fixed duration.

At 130, the speech segments obtained at 120 may be clustered into a plurality of clusters. Through the clustering operation at 130, the speech segments may be merged based on similarity, such that there is a one-to-one correspondence between the resulted clusters and the speakers. Firstly, speaker feature vectors or embedding vectors may be obtained for the speech segments, e.g., i-vectors, x-vectors, etc. Then speech similarity scoring may be performed with the speaker feature vectors among the speech segments. For example, the speech similarity scoring may be based on. e.g., probabilistic linear discriminant analysis (PLDA), Bayesian information criterion (BIC), generalized likelihood ratio (GLR), Kullback-Leibler divergence (KLD), etc. Thereafter, the speech segments may be merged based on similarity scores under a predetermined clustering strategy. e.g., agglomerative hierarchical clustering (AHC), etc. For example, those speech segments having high similarity scores among each other may be merged into a cluster.

The clustering operation at 130 will stop when a stop criterion is met. This stop criterion indicates that the number of the resulted clusters is equal to the number of speakers involved in the audio stream. That is, the clustering is always stopped when the number of the resulted clusters reaches the number of speakers. In one case, the speaker number is already known. For example, before performing the speaker diarization, it has been known how many speakers are involved in the audio stream. In another case, the speaker number is not known and thus should be estimated before performing the clustering. Usually, the speaker number is estimated through setting a threshold on similarity score of the to-be-merged clusters. When the similarity score between the to-be-merged clusters doesn't satisfy the constraint of the threshold, the clustering is stopped and the number of current clusters is the estimation of the number of speakers.

A plurality of clusters may be generated through the clustering operation at 130, wherein the number of the clusters is equal to the number of speakers, and each cluster is assumed to correspond to a speaker.

At 140, a speaker classification model may be established based on the clusters generated at 130, which is further used for achieving frame alignment between the audio stream and the speakers. In other words, the clusters may be used for initializing the speaker classification model. The speaker classification model may be, e.g., a hidden Markov model (HMM). As an example, firstly, for each of the clusters, a Gaussian mixture model (GMM) may be established. Accordingly, this GMM is also associated with a speaker corresponding to the cluster. In this way, a plurality of GMMs may be obtained, and each GMM corresponds to a respective speaker. Then, an HMM may be established based on the plurality of GMMs, wherein each state of the HMM is associated with a respective GMM and thus associated with a respective speaker.

At 150, frame alignment may be performed through the speaker classification model. The frame alignment may also be referred to as frame re-segmentation. Speech frames in the audio stream may be provided to the speaker classification model, e.g., HMM, to align to respective HMM states of the HMM, and accordingly to align to respective speakers. The final result of the speaker diarization would be provided after the frame alignment.

It should be appreciated that the speaker diarization in FIG. 1 is only an example of traditional speaker diarization, and other traditional speaker diarization may comprise different operations. For example, in some traditional speaker diarization, the modeling operation at 140 and the alignment operation at 150 may be omitted. In this case, the final result of the speaker diarization would be based on the clusters obtained at 130.

Figure 2:
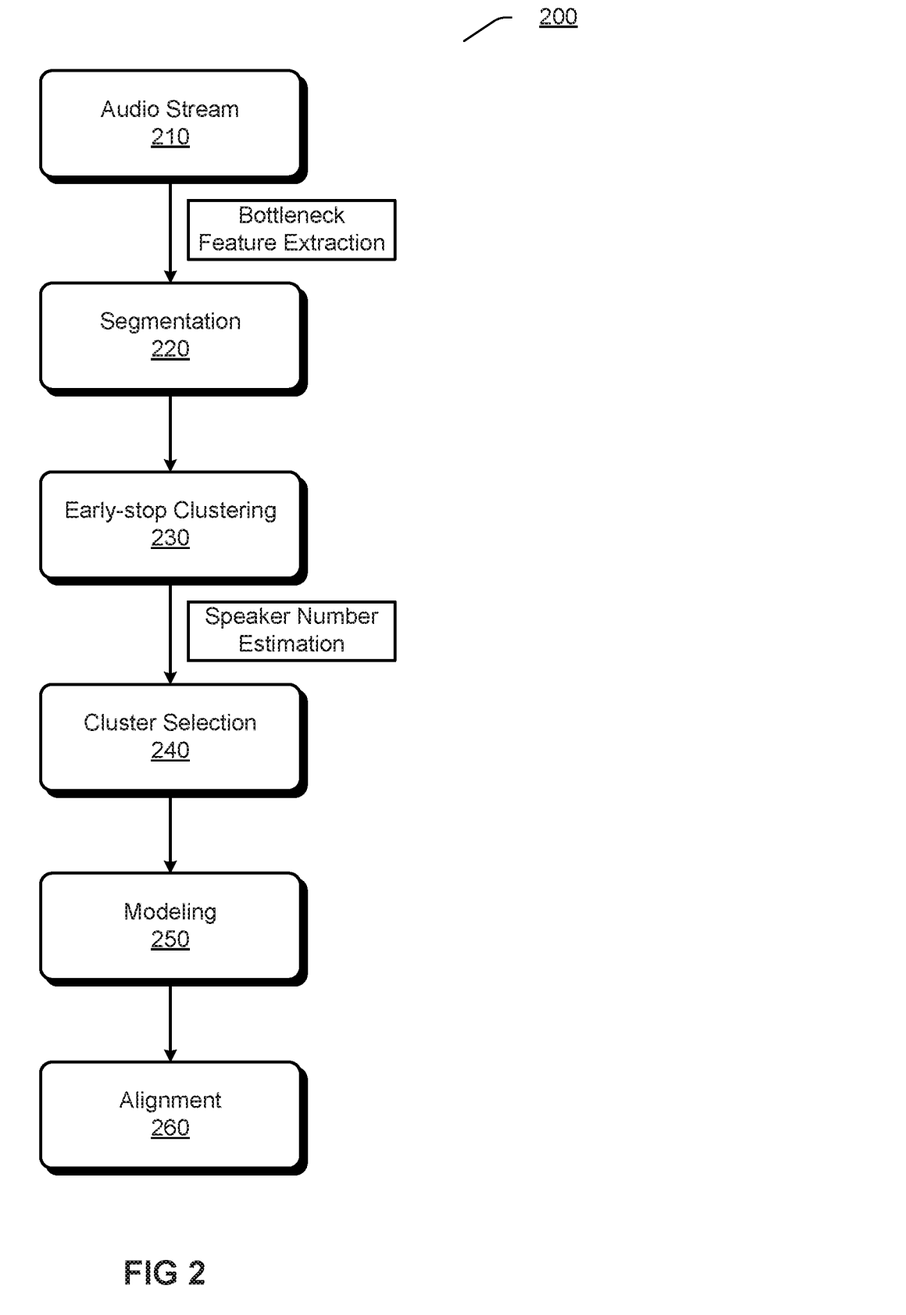
FIG. 2 illustrates an exemplary process of speaker diarization with early-stop clustering according to an embodiment.

FIG. 2 illustrates an exemplary process 200 of speaker diarization with early-stop clustering according to an embodiment. The process 200 provides an improvement for the traditional speaker diarization, e.g., the process 100 in FIG. 1, through applying early-stop clustering during speaker diarization.

At 210, an audio stream may be obtained.

In some implementations, the process 200 may adopt speaker acoustic features, as the traditional speaker diarization does, for the following operations. e.g., segmentation, clustering, modeling, alignment, etc. In this case, a speaker acoustic feature vector may be extracted for each speech frame in the audio stream. The extracted speaker acoustic feature vectors of the speech frames in the audio stream may be further used for the following operations.

In other implementations, as shown in FIG. 2, the process 200 may adopt speaker bottleneck features for the following operations, instead of speaker acoustic features. The speaker diarization may benefit from the use of speaker bottleneck features, because the speaker bottleneck features may have a relative low dimension and avoid influences by speech content, background noise, reverberation, etc. in the audio stream. Compared with speaker acoustic features, the speaker bottleneck features may better represent speech frames in the audio stream and acoustic characteristics of speakers, and need lower computation cost.

According to an exemplary process of extracting speaker bottleneck features, for each speech frame in the audio steam, a speaker acoustic feature of the speech frame may be extracted, and then a speaker bottleneck feature of the speech frame may be generated based on the speaker acoustic feature through a neural network. e.g., deep neural network (DNN). The DNN may be trained to classify among a number of N speakers with the loss function to be cross-entropy. The DNN may comprise an input layer, a plurality of hidden layers, an output layer, etc. At the input layer, a speaker acoustic feature vector of a current speech frame and optional contextual speaker acoustic feature vectors of contextual speech frames may concatenated together as an input vector. Alternatively, contextual speaker acoustic feature vectors may also be omitted, and thus the speaker acoustic feature vector of the current speech frame may be taken as the input vector directly. The input vector will then be processed through the plurality of hidden layers. The last hidden layer is a bottleneck layer, the dimension of which is lower than other hidden layers. The output layer comprises a plurality of nodes representing a plurality of speakers in a training set respectively, denoted as $\{spk_1, spk_2, \ldots, spk_N\}$, where N is the number of training speakers. Given a speaker acoustic feature vector extracted from a speech frame, a linear output of the bottleneck layer may be extracted as a speaker bottleneck feature vector b. Moreover, given a sequence of speaker acoustic feature vectors extracted from speech frames in a speech segment, linear outputs of the bottleneck layer may be extracted as a set of speaker bottleneck feature vectors, $B = U_{t=1}^{T} b_t$, for the speech segment, wherein T is the number of the speech frames in the speech segment. Accordingly, a speaker bottleneck feature herein may refer to a speaker bottleneck feature vector or a set of speaker bottleneck feature vectors.

In the following discussion, speaker bottleneck features are adopted during the speaker diarization. However, it should be appreciated that the inventive concept of the present disclosure may be also implemented in a similar way with the case of adopting speaker acoustic features during the speaker diarization.

At 220, speech segmentation may be performed on the audio stream to obtain a plurality of speech segments. The speech segmentation at 220 is similar with the speech segmentation at 120 in FIG. 1, except that the speech segmentation at 220 adopts speaker bottleneck features for detecting speaker change points in the audio stream and accordingly segmenting the audio stream into the plurality of speech segments.

At 230, early-stop clustering may be performed on the speech segments obtained at 220 so as to generate a plurality of clusters. Through the early-stop clustering operation at 230, the speech segments may be clustered into the plurality of clusters, wherein the number of the clusters is greater than the number of speakers. In other words, the clustering may be stopped before the number of the resulted clusters reaches the number of speakers.

In an implementation, the speech segments may be iteratively clustered into the plurality of clusters based on cosine similarity and/or BIC scores. Predetermined criteria, e.g., early-stop criteria, may be designed for ensuring that the number of the resulted clusters is greater than the number of speakers. For example, the early-stop criteria may be defined by at least one of a cosine similarity threshold, a BIC score threshold, penalty weight used for calculating the BIC scores, etc. During the iteratively clustering, it is determined whether the cosine similarity and/or the BIC scores meet the early-stop criteria. If the early-stop criteria are not met, the iteratively clustering may continue, else if the early-stop criteria are met, the iteratively clustering may be stopped. In some implementations, the early-stop criteria may be set or adjusted empirically. On one hand, the early-stop criteria may ensure that the number of the resulted clusters is greater than the number of speakers, and on the other hand, the early-stop criteria may consider that each resulted cluster shall not be too small, i.e., shall contain enough information for the later establishment of speaker classification model. The early-stop clustering operation at 230 will be further discussed in connection with FIGS. 3-4.

At 240, cluster selection may be performed on the clusters generated at 230. One or more clusters may be selected from the clusters generated at 230, wherein the selected clusters may be of the highest similarity among the clusters generated at 230, and the number of the selected clusters corresponds to the number of speakers. Since the clusters generated at 230 are obtained through the early-stop clustering, these clusters may be purer in terms of speakers as compared with the clustering operation in the traditional speaker diarization. Accordingly, the clusters selected at 240 may be associated with respective speakers with a higher probability. That is, for a selected cluster, it is very likely that speech segments in this cluster are indeed from the same speaker. The cluster selection at 240 will be further discussed in connection with FIG. 6.

It should be appreciated that in some cases, the number of speakers in the audio stream is not known, and thus the process 200 may further comprise a speaker number estimation operation for estimating the number of speakers based on the clusters generated at 230. The speaker number estimation may be performed before the cluster selection at 240, and accordingly, the estimated speaker number may be utilized when selecting clusters. The speaker number estimation will be further discussed in connection with FIG. 5.

At 250, a speaker classification model may be established based on the clusters selected at 240. The modeling operation at 250 is similar with the modeling operation at 140 in FIG. 1, except that at 250, it is the selected clusters obtained at 240 that are used for establishing or initializing the speaker classification model. As an example, the speaker classification model may be an HMM. In this case, for each of the selected clusters, a GMM may be established, which is associated with a speaker corresponding to the selected cluster. A plurality of GMMs may be obtained for the selected clusters, and further used for establishing the HMM, such that each state of the HMM is associated with a respective GMM and thus associated with a respective speaker. Benefiting from the fact that the selected clusters used for establishing the HMM are high-quality and high-pureness clusters, the established HMM may possess a higher performance for discriminating speeches from different speakers, as compared with the HMM established in the traditional speaker diarization.

At 260, frame alignment may be performed through the speaker classification model established at 250. Speech frames in the audio stream may be provided to the speaker classification model, e.g., HMM, to align to respective HMM states of the HMM, and accordingly to align to respective speakers.

In an implementation, the frame alignment may be performed on each speech frame in the audio stream, and thus each speech frame in the audio stream may be aligned to a respective speaker through the speaker classification model. Finally, all the speech frames in the audio stream are corresponded to respective speakers through the frame alignment, which may be provided as a result of the process 200 of speaker diarization.

In another implementation, the frame alignment may be performed on each speech frame in those clusters not selected at 240, and thus each speech frame in the unselected clusters may be aligned to a respective speaker through the speaker classification model. Finally, the speech frames aligned to respective speakers through the frame alignment at 260 and speech frames in the selected clusters corresponding to respective speakers selected at 240, may be combined together to provide a result of the process 200 of speaker diarization. For example, for a given speaker, if a cluster, which corresponds to this speaker and comprises a first group of speech frames, is selected at 240, and a second group of speech frames is aligned to this speaker through the frame alignment at 260, then the first group of speech frames and the second group of speech frames may be combined together as a collection of all the speech frames corresponding to this speaker in the audio stream.

It should be appreciated that all the operations in the process 200 as shown in FIG. 2 are exemplary, and according to actual designs and requirements, the speaker diarization with early-stop clustering according to the embodiments of the present disclosure shall cover any changes, replacement, additions, etc. to the process 200. For example, in an implementation, the speaker diarization may further comprise an updating operation of the speaker classification model. Assuming that the speaker classification model is an HMM established with GMMs. After aligning at least one speech frame in the audio stream to a first speaker through the frame alignment at 260, the GMM corresponding to the first speaker may be updated, e.g., retrained, with the at least one speech frame. Then the updated GMM corresponding to the first speaker may be used for updating or retrained the HMM, thus updating various states of the HMM that correspond to respective speakers. Through continuously performing the above updating operation of the speaker classification model along with aligning speech frames to different speakers, the speaker classification model may be continuously improved in terms of its performance of discriminating different speakers during the speaker diarization, and accordingly the accuracy of the speaker diarization is also improved.

Figure 3:
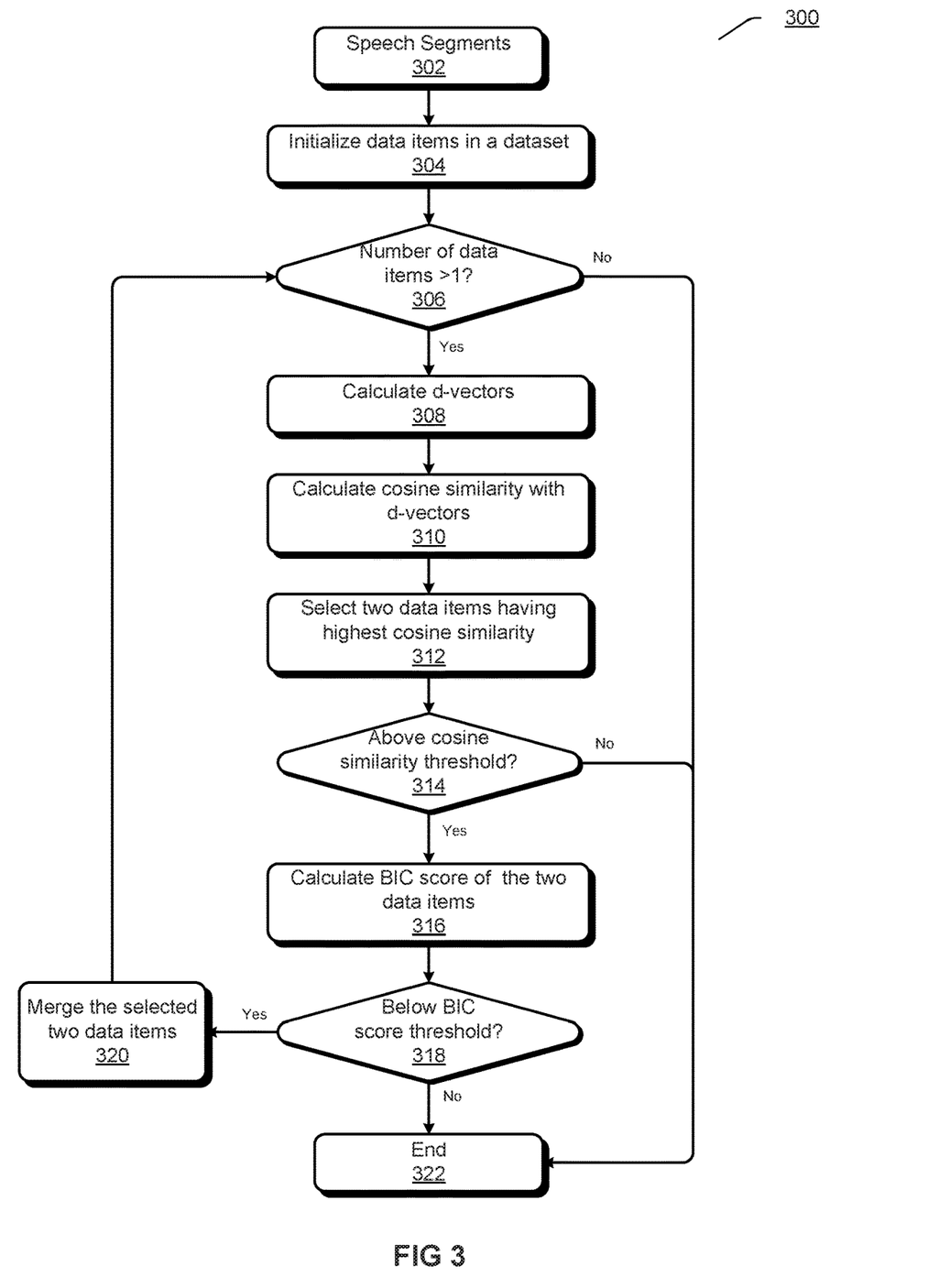
FIG. 3 illustrates an exemplary process of performing early-stop clustering in speaker diarization according to an embodiment.

FIG. 3 illustrates an exemplary process 300 of performing early-stop clustering in speaker diarization according to an embodiment. Through the process 300, speech segments in an audio stream may be iteratively clustered into a plurality of clusters based on cosine similarity and/or BIC scores, wherein predetermined early-stop criteria is designed for ensuring that the number of the resulted clusters is greater than the number of speakers.

At 302, one or more speech segments may be obtained. The speech segments may be produced by the speech segmentation 220 in FIG. 2 through segmenting an audio stream.

At 304, the speech segments may be used for initializing a dataset. The dataset may comprise one or more data items, which are initialized by the speech segments respectively. Through forming the dataset, the iteratively clustering of speech segments into a plurality of clusters based on cosine similarity and/or BIC scores is transformed to iteratively clustering of the data items in the dataset into the plurality of clusters based on cosine similarity and/or BIC scores among the data items in the dataset. Specifically, cosine similarity may be calculated based at least on d-vectors of two data items in the dataset, and a BIC score may be calculated based at least on Gaussian parameters of two data items in the dataset. It should be appreciated that the concepts of "dataset" and "data items" are introduced herein merely for the convenience of explaining the iteratively clustering process below. During the iteratively clustering, the number of data items in the dataset will gradually reduce along with the iterations of clustering. During the iteratively clustering, a data item in the dataset may either refer to a speech segment which is not clustered with other speech segments or clusters yet, or refer to a cluster which was generated by two or more speech segments or clusters in at least one previous iteration. When the process 300 ends, data items in the dataset may be deemed as clusters generated by the early-stop clustering. However, in other cases, the initializing of the dataset may also be omitted from the process 300 and thus the iteratively clustering may be performed directly on the speech segments.

At 306, it is determined whether the number of data items in the dataset is above 1. If yes, the process 300 proceeds to step 308. Else if the number of data items is equal to 1, the process 300 will end at 322. It should be appreciated that the determining operation at 306 is optional, and may be omitted from the process 300.

At 308, a d-vector may be calculated for each data item in the dataset. As discussed above, a data item in the dataset may be a speech segment or a cluster formed by two or more speech segments, wherein each speech segment may be represented by, e.g., a speaker bottleneck feature. Accordingly, a d-vector for a data item may be calculated as a mean vector among speaker bottleneck features of all the speech segments in this data item.

At 310, cosine similarity of every two data items in the dataset may be calculated with d-vectors of the two data items. The cosine similarity of the two data items may also be referred to as a cosine distance between the two d-vectors of the two data items, which is used for assessing relevance between the two data items.

At 312, two data items having the highest cosine similarity in the dataset may be selected. The selected two data items may be deemed as data items having the highest relevance with each other in the current dataset.

After selecting the two data items, the following steps of the process 300 may further decide whether to merge the selected two data items based on predetermined early-stop criteria. For example, the decision may be made through determining whether the cosine similarity and a BIC score of the selected two data items meet a cosine similarity threshold and a BIC score threshold respectively. If both the cosine similarity threshold and the BIC score threshold are met, the selected two data items may be merged into a new data item in the dataset, else if the cosine similarity threshold and/or the BIC score threshold are not met, the process 300 may be stopped.

At 314, it is determined whether the cosine similarity of the selected two data items is above a cosine similarity threshold. The cosine similarity threshold is a part of the predetermined early-stop criteria, and is derived or set under the consideration of ensuring an early-stop of clustering. For example, the cosine similarity threshold may be set as 0.7, etc.

If the cosine similarity of the selected two data items is not above the cosine similarity threshold, the process 300 will end at 322, otherwise, the process 300 proceeds to step 316.

At 316, a BIC score of the selected two data items is calculated. The BIC score may be calculated based at least on Gaussian parameters of the two data items according to various existing techniques. The following is an example of the calculating of BIC score.

Given two data items $\mathcal{O}_1$ and $\mathcal{O}_2$, e.g., two speech segments or clusters, two hypotheses are defined on whether they are generated by the same model or not as follows:

$$\mathcal{H}_0: \{\mathcal{O}_1, \mathcal{O}_2\} \sim \mathcal{N}_{(\mu,\Sigma)}$$

$$\mathcal{H}_1: \mathcal{O}_1 \sim \mathcal{N}_{(\mu_1,\Sigma_1)}; \mathcal{O}_2 \sim \mathcal{N}_{(\mu_2,\Sigma_2)} \quad \text{Equation (1)}$$

where $\{\mu_1, \Sigma_1\}$, $\{\mu_2, \Sigma_2\}$ and $\{\mu, \Sigma\}$ are Gaussian parameters {mean, covariance} estimated on $\mathcal{O}_1$, $\mathcal{O}_2$ and $\{\mathcal{O}_1, \mathcal{O}_2\}$ respectively.

The model selection target function is the likelihood comparison of the two hypotheses combined with BIC as follows:

$$BIC = R - \lambda P \quad \text{Equation (2)}$$

where R is the likelihood comparison of the two hypotheses as:

$$R = (N_1 + N_2)\log|\Sigma| - N_1 \log|\Sigma_1| - N_2 \log|\Sigma_2| \quad \text{Equation (3)}$$

and $\lambda$ is the penalty weight. P is computed as:

$$P = \tfrac{1}{2}(d + \tfrac{1}{2}d(d+1))\log|N_1 + N_2| \quad \text{Equation (4)}$$

where d is the dimension of the vector space, e.g., the dimension of speaker bottleneck feature vector; and $N_1$ and $N_2$ are the numbers of speech frames in $\mathcal{O}_1$ and $\mathcal{O}_2$ respectively.

In the above calculation of BIC score, the penalty weight $\lambda$ is a parameter to be tuned. For example, the penalty weight $\lambda$ may be set as 2, 2.2, etc. Since the penalty weight influences the BIC score and further influences whether to merge the two data items in the following steps, it is also a part of the predetermined early-stop criteria and used for ensuring the early-stop of clustering.

At 318, it is determined whether the BIC score of the selected two data items is below a BIC score threshold. The BIC score threshold is a part of the predetermined early-stop criteria, and is derived or set under the consideration of ensuring the early-stop of clustering. For example, the BIC score threshold may be set as 0.

If the BIC score of the selected two data items is not below the BIC score threshold, the process 300 will end at 322. Otherwise, if the BIC score of the selected two data items is below the BIC score threshold, the selected two data items may be merged at 320 into a new data item in the dataset. This new data item will be processed in the following iterations. Accordingly, since the two data items are merged into one new data item, the dataset is updated and the number of data items in the dataset will be reduced by one. Then, the process 300 will return to the step 306 to perform the next iteration.

Through the iteratively clustering according to the process 300, a plurality of data items will be finally obtained in the dataset, which correspond to a plurality of resulted clusters. Depending on the predetermined early-stop criteria, the number of the resulted clusters is greater than the number of speakers.

It should be appreciated that all the operations and orders of these operations in the process 300 are exemplary, and any changes, replacement, additions, etc. may be made to the process 300. For example, the calculating of BIC score at 316 may also be performed before the determination operation at 314, and accordingly, the determination operation at 314 and the determination operation at 318 may be jointly performed. e.g., determining whether both the cosine similarity threshold and the BIC score threshold are met. If both are met, the process may proceed to merge the selected two data items at 320; otherwise if either of the cosine similarity threshold and the first BIC score threshold is not met, the process will end the iteratively clustering at 322.

The process 300 is discussed above as an independent early-stop clustering process, that is, a result of early-stop clustering may be provided by the process 300. However, in some implementations, the process 300 may also be deemed as a first stage in an early-stop clustering process, and the early-stop clustering process may further comprise a second stage.

Figure 4:
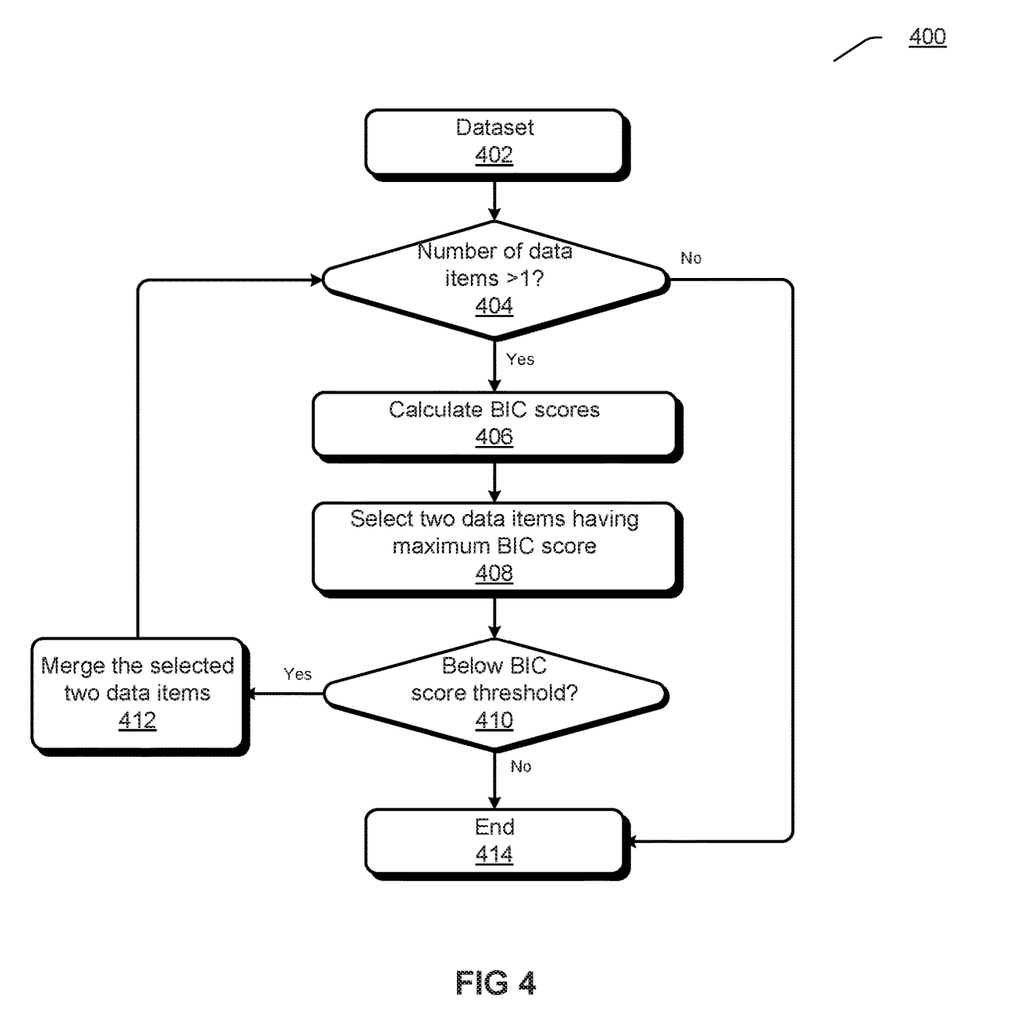
FIG. 4 illustrates an exemplary process of performing early-stop clustering in speaker diarization according to an embodiment.

FIG. 4 illustrates an exemplary process 400 of performing early-stop clustering in speaker diarization according to an embodiment. In one aspect, the process 400 is a continuation of the process 300 in FIG. 2, and thus may be deemed as a second stage in an early-stop clustering process. The process 400 may be performed for iteratively clustering data items in a dataset into a plurality of clusters.

At 402, a dataset may be obtained. The dataset may come from the process 300 in FIG. 3. i.e., the dataset is a dataset finally resulted by the process 300.

At 404, it is determined whether the number of data items in the dataset is above 1. If yes, the process 400 proceeds to step 406. Else if the number of data items is equal to 1, the process 400 will end at 414. It should be appreciated that the determining operation at 404 is optional, and may be omitted from the process 400.

At 406, a BIC score of every two data items in the dataset may be calculated. In the calculation of BIC score, the penalty weight $\lambda$ is a parameter to be tuned. For example, the penalty weight $\lambda$ at 406 may be set as 1.7, 2, etc. Since the penalty weight influences the BIC score and further influences whether to merge the two data items in the following steps, it is also a part of the predetermined early-stop criteria and used for ensuring the early-stop of clustering. It should be appreciated that the penalty weight at 406 may be different from the penalty weight at 316 in FIG. 3.

At 408, two data items having the maximum BIC score in the dataset may be selected based on the BIC scores calculated at 406 from the data items in the dataset. The selected two data items may be deemed as data items having the highest relevance with each other in the current dataset.

After selecting the two data items, the following steps of the process 400 may further decide whether to merge the selected two data items based on predetermined early-stop criteria. For example, the decision may be made through determining whether the BIC score of the selected two data items meets a BIC score threshold. If meets, the selected two data items may be merged into a new data item in the dataset, else if not meets, the process 400 may be stopped.

At 410, it is determined whether the BIC score of the selected two data items meets a BIC score threshold. The BIC score threshold is a part of the predetermined early-stop criteria, and is derived or set under the consideration of ensuring the early-stop of clustering. For example, the BIC score threshold may be the same as or different from the BIC score threshold used at 318 in FIG. 3.

If the BIC score of the selected two data items is not below the BIC score threshold, the process 400 will end at 414. Otherwise, if the BIC score of the selected two data items is below the BIC score threshold, the selected two data items may be merged at 412 into a new data item in the dataset. This new data item will be processed in the following iterations. Accordingly, since the two data items are merged into one new data item, the dataset is updated and the number of data items in the dataset will be reduced by one. Then, the process 400 will return to the step 404 to perform the next iteration.

Through the iteratively clustering according to the process 400, a plurality of data items will be finally obtained in the dataset, which correspond to a plurality of resulted clusters. Depending on the predetermined early-stop criteria, the number of the resulted clusters is greater than the number of speakers.

The process 400 is discussed above as a second stage of early-stop clustering process, that is, a result of early-stop clustering may be provided through the combination of the process 300 and the process 400. It should be appreciated that, in some implementations, the order of the process 300 and the process 400 may also be interchanged. For example, the process 400 is the first stage of early-stop clustering process, and the process 300 is the second stage of early-stop clustering process. Moreover, in some implementations, the process 400 may also be an independent early-stop clustering process, and thus a result of the early-stop clustering process may be provided merely by the process 400. In this case, the step of obtaining a dataset at 402 may comprise obtaining one or more speech segments which are produced by the speech segmentation 220 in FIG. 2 through segmenting an audio stream, and initializing one or more data items in the dataset with the speech segments.

Figure 5:
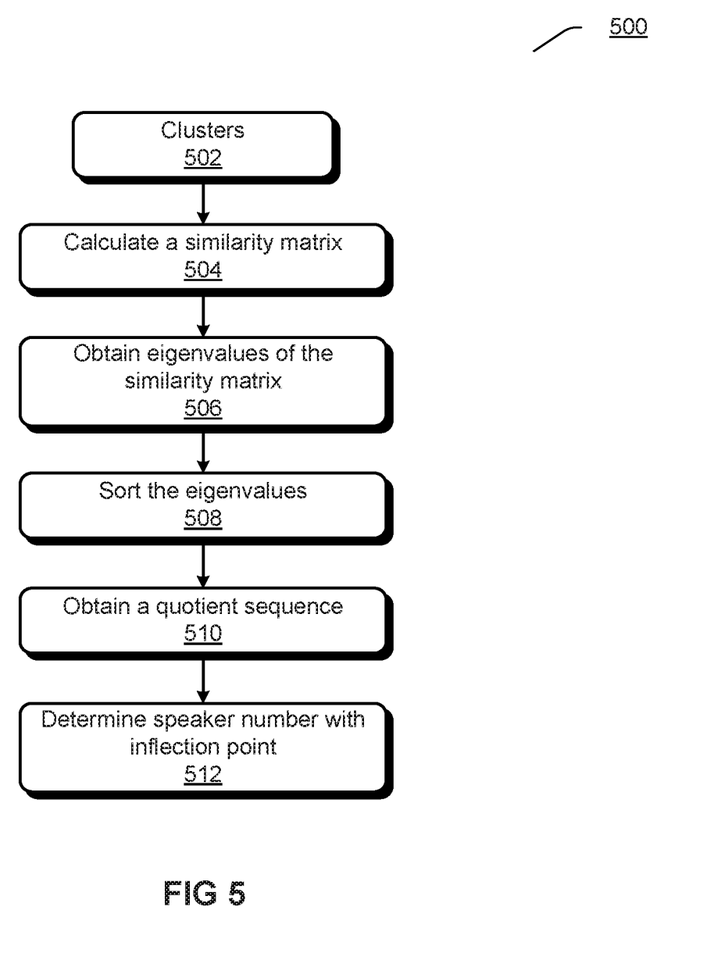
FIG. 5 illustrates an exemplary process of estimating speaker number in speaker diarization according to an embodiment.

FIG. 5 illustrates an exemplary process 500 of estimating speaker number in speaker diarization according to an embodiment. The process 500 is an example of the speaker number estimation in FIG. 2 which is performed for estimating the number of speakers in an audio stream based on a plurality of clusters generated through early-stop clustering. The process 500 may adopt, e.g., eigenvalue decomposition-based estimation approach.

At 502, a plurality of clusters may be obtained. The clusters may be generated by the early-stop clustering 230 in FIG. 2, the process 300 in FIG. 3 or the process 400 in FIG. 4. The number of the plurality of clusters is denoted as K.

At 504, a similarity matrix S of the plurality of clusters may be calculated. In an implementation, the similarity matrix may be calculated based on BIC scores of the K clusters. The similarity matrix S is a symmetric matrix in a $K \times K$ dimension, wherein $S_{j,k}$ is the similarity between cluster j and cluster k, where j=1, . . . , K, and k=1, . . . , K.

At 506, a plurality of eigenvalues of the similarity matrix S may be obtained through performing eigenvalue decomposition on the similarity matrix S. For example, a number of K eigenvalues may be obtained for the similarity matrix S.

At 508, the K eigenvalues are sorted in a descending order as $[e_1, \ldots, e_K]$.

At 510, a quotient sequence may be obtained through successive division of the sorted eigenvalues. For example, the quotient sequence may be obtained through dividing every two successive eigenvalues in the sorted plurality of eigenvalues. The quotient sequence may be denoted as a K−1 dimension vector $\varsigma = [\varsigma_1, \ldots, \varsigma_{K-1}]$, where $\varsigma_k = e_k / e_{k+1}$.

At 512, the number of speakers may be determined through identifying an inflection point in the quotient sequence. The inflection point may refer to a sudden drop in the quotient sequence. The number of speakers M may be estimated with the k where there is a sudden drop, i.e., $$M = \arg\max_k \varsigma_k \qquad \text{Equation (5)}$$

The process 500 which is based on eigenvalue decomposition has a high accuracy in estimating the number of speakers as compared with the traditional speaker number estimation approach.

Figure 6:
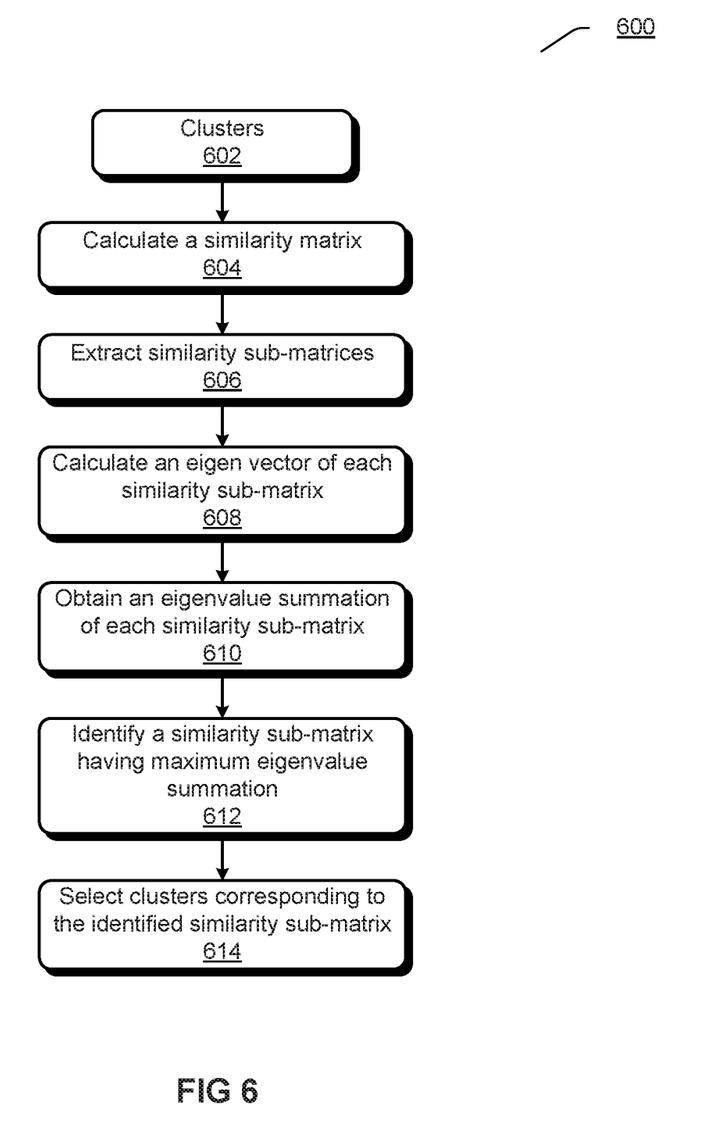
FIG. 6 illustrates an exemplary process of selecting clusters in speaker diarization according to an embodiment.

FIG. 6 illustrates an exemplary process 600 of selecting clusters in speaker diarization according to an embodiment. The process 600 is an example of the cluster selection 240 in FIG. 2 which is performed for selecting a number of M clusters from a plurality of clusters generated through early-stop clustering operation at 230 in FIG. 2, wherein M is the number of speakers in the audio stream and may be already known or estimated through the process 500 in FIG. 5. The selected clusters may be further used for establishing a speaker classification model.

According to the process 600, the selected clusters may be of the highest similarity among the clusters generated through early-stop clustering. For example, the process 600 may calculate a similarity metric of every group of M clusters among the clusters generated through early-stop clustering, and select a group of M clusters having the maximum similarity metric. In an implementation, the cluster selection process may be based on, e.g., exhaustive search and eigenvalue summation.

At 602, a plurality of clusters may be obtained. The clusters may be generated by the early-stop clustering 230 in FIG. 2, the process 300 in FIG. 3 or the process 400 in FIG. 4. The number of the plurality of clusters is denoted as K.

At 604, a similarity matrix S of the K clusters may be calculated in a similar way with the step 504 in FIG. 5.

At 606, a plurality of similarity sub-matrices may be exhaustively extracted from the similarity matrix S. Each similarity sub-matrix may be a $M \times M$ matrix. M being the number of speakers.

Specifically, the step 606 may select any M clusters, indexed as $l_j = \{i_1, \ldots, i_M\}$, where $i_m$ indexes the m-th selected cluster in the K clusters. A similarity sub-matrix $s_l$ may be extracted from the similarity matrix S, with elements in the j-th row and the k-th column as $s_l(j,k) = S(i_j, i_k)$. All the possible combinations of M clusters may be exhaustively searched from the K clusters, and a number of L similarity sub-matrices may be finally got, denoted as $\cup_{l=1}^{L} s_l$.

At 608, an eigen vector of each similarity sub-matrix may be calculated. For example, eigenvalue decomposition may be performed on the L similarity sub-matrices so as to obtain L eigen vectors corresponding to the L similarity sub-matrices respectively. Each eigen vector comprises M eigenvalues.

At 610, an eigenvalue summation of each similarity sub-matrix may be obtained through summating eigenvalues in an eigen vector of the similarity sub-matrix. For example, absolute values of eigenvalues in the L eigen vectors may be obtained, and absolute eigenvalues in each eigen vector may be summed up. Accordingly, a number of L eigenvalue summations may be obtained, denoted as $\{\eta_1, \ldots, \eta_L\}$, wherein $\eta_l$ (l=1, . . . , L) is the eigenvalue summation calculated on the l-th similarity sub-matrix.

At 612, a similarity sub-matrix having the maximum eigenvalue summation may be identified from the L similarity sub-matrices.

At 614, a group of M clusters corresponding to the identified similarity sub-matrix may be selected. For example, M clusters in the l*-th combination may be selected as follows:

$$l^* = \arg\max_l \eta_l \quad \text{Equation (6)}$$

The selected M clusters are of the highest similarity among the K clusters generated through early-stop clustering. According to the embodiments of the present disclosure, the selected M clusters may be further used for establishing a speaker classification model.

Figure 7:
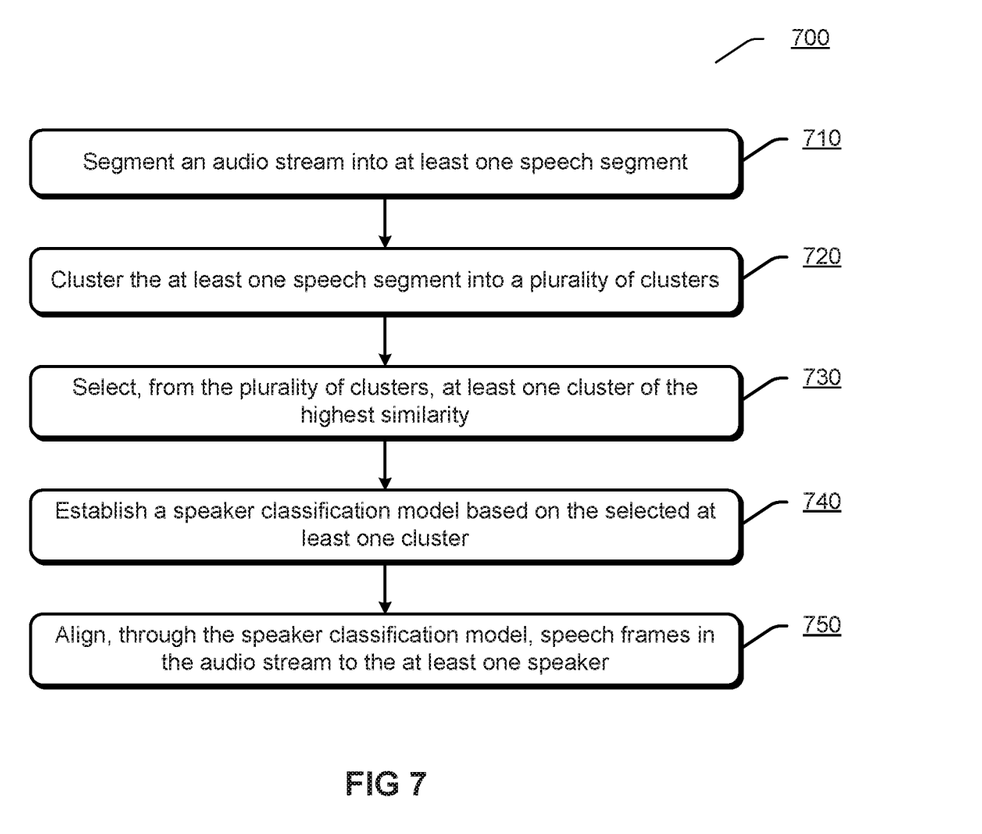
FIG. 7 illustrates a flowchart of an exemplary method for speaker diarization according to an embodiment.

FIG. 7 illustrates a flowchart of an exemplary method 700 for speaker diarization according to an embodiment.

At 710, an audio stream may be segmented into at least one speech segment, the audio stream comprising speeches from at least one speaker.

At 720, the at least one speech segment may be clustered into a plurality of clusters, the number of the plurality of clusters being greater than the number of the at least one speaker.

At 730, at least one cluster of the highest similarity may be selected from the plurality of clusters, the number of the selected at least one cluster being equal to the number of the at least one speaker.

At 740, a speaker classification model may be established based on the selected at least one cluster.

At 750, speech frames in the audio stream may be aligned to the at least one speaker through the speaker classification model.

In an implementation, the clustering may comprise iteratively clustering the at least one speech segment into the plurality of clusters based on cosine similarity and/or BIC scores. For example, the clustering may comprise: initializing a dataset by the at least one speech segment, the dataset comprising at least one data item initialized by the at least one speech segment respectively; and iteratively clustering the at least one data item into the plurality of clusters, based on cosine similarity and/or BIC scores among data items in the dataset.

In the above implementation, the method may further comprise: determining whether the cosine similarity and/or the BIC scores meet predetermined criteria, the predetermined criteria being defined by at least one of a cosine similarity threshold, a BIC score threshold, and penalty weight used for calculating the BIC scores; and stopping the clustering if the cosine similarity and/or the BIC scores meet the predetermined criteria.

In the above implementation, cosine similarity may be calculated based at least on d-vectors of two data items, and a BIC score may be calculated based at least on Gaussian parameters of two data items.

In the above implementation, the iteratively clustering the at least one data item into the plurality of clusters may comprise iteratively performing a series of operations including: calculating a BIC score of every two data items in the dataset; selecting two data items having the maximum BIC score in the dataset; determining whether the BIC score of the selected two data items meets a BIC score threshold; and if the BIC score threshold is met, merging the selected two data items into a new data item in the dataset, else if the BIC score threshold is not met, stopping performing the series of operations.

In the above implementation, the iteratively clustering the at least one data item into the plurality of clusters may comprise iteratively performing a first series of operations including: calculating a d-vector for each data item in the dataset; calculating cosine similarity of every two data items in the dataset with d-vectors of the two data items; selecting two data items having the highest cosine similarity in the dataset; calculating a BIC score of the selected two data items; determining whether the cosine similarity and the BIC score of the selected two data items meet a cosine similarity threshold and a first BIC score threshold respectively; and if both the cosine similarity threshold and the first BIC score threshold are met, merging the selected two data items into a new data item in the dataset, else if the cosine similarity threshold and/or the first BIC score threshold are not met, stopping performing the first series of operations. Moreover, the method may further comprise iteratively performing a second series of operations including: calculating a BIC score of every two data items in the dataset; selecting two data items having the maximum BIC score in the dataset; determining whether the BIC score of the selected two data items meets a second BIC score threshold; and if the second BIC score threshold is met, merging the selected two data items into a new data item in the dataset, else if the second BIC score threshold is not met, stopping performing the second series of operations.

In the above implementation, the BIC score may be calculated based at least on a respective penalty weight.

In an implementation, the selecting may comprise: calculating a similarity metric of every group of M clusters among the plurality of clusters. M being the number of the at least one speaker, and selecting a group of M clusters having the maximum similarity metric.

In an implementation, the selecting may comprise: calculating a similarity matrix of the plurality of clusters; exhaustively extracting a plurality of similarity sub-matrices from the similarity matrix, each similarity sub-matrix being a M×M matrix, M being the number of the at least one speaker, calculating an eigen vector of each similarity sub-matrix; obtaining an eigenvalue summation of each similarity sub-matrix through summating eigenvalues in an eigen vector of the similarity sub-matrix; identifying a similarity sub-matrix having the maximum eigenvalue summation from the plurality of similarity sub-matrices; and selecting a group of M clusters corresponding to the identified similarity sub-matrix.

In an implementation, the speaker classification model may be an HMM. The establishing the speaker classification model may comprise: establishing at least one GMM with the selected at least one cluster respectively, each GMM corresponding to a speaker in the at least one speaker; and establishing the HMM with the at least one GMM, each state of the HMM being associated with a GMM in the at least one GMM.

In the above implementation, the method may further comprise: after aligning at least one speech frame in the audio stream to a first speaker in the at least one speaker, updating a GMM corresponding to the first speaker with the at least one speech frame; and updating the HMM with the updated GMM corresponding to the first speaker.

In an implementation, the aligning may comprise: aligning each speech frame in the audio stream to a respective speaker in the at least one speaker, or aligning each speech frame in at least one unselected cluster in the plurality of clusters to a respective speaker in the at least one speaker.

In an implementation, the method may further comprise: estimating the number of the at least one speaker based on the plurality of clusters.

In the above implementation, the estimating may comprise: calculating a similarity matrix of the plurality of clusters; obtaining a plurality of eigenvalues of the similarity matrix through performing eigenvalue decomposition on the similarity matrix; sorting the plurality of eigenvalues in a descending order; obtaining a quotient sequence through dividing every two successive eigenvalues in the sorted plurality of eigenvalues; and determining the number of the at least one speaker through identifying an inflection point in the quotient sequence.

In an implementation, the speech frames in the audio stream may be represented by speaker bottleneck features. The method may further comprise, for each speech frame in the audio steam: extracting a speaker acoustic feature of the speech frame; and generating, through a neural network, a speaker bottleneck feature of the speech frame based on the speaker acoustic feature.

It should be appreciated that the method 700 may further comprise any steps/processes for speaker diarization with early-stop clustering according to the embodiments of the present disclosure as mentioned above.

Figure 8:
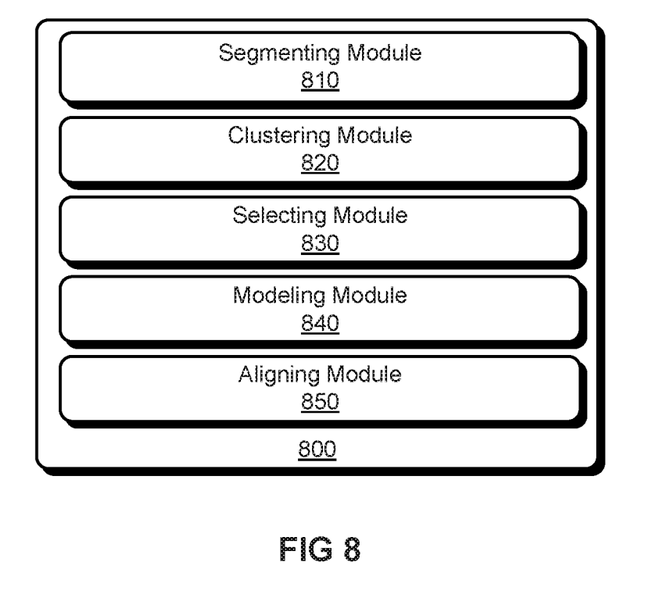
FIG. 8 illustrates an exemplary apparatus for speaker diarization according to an embodiment.

FIG. 8 illustrates an exemplary apparatus 800 for speaker diarization according to an embodiment.

The apparatus 800 may comprise: a segmenting module 810, for segmenting an audio stream into at least one speech segment, the audio stream comprising speeches from at least one speaker; a clustering module 820, for clustering the at least one speech segment into a plurality of clusters, the number of the plurality of clusters being greater than the number of the at least one speaker; a selecting module 830, for selecting, from the plurality of clusters, at least one cluster of the highest similarity, the number of the selected at least one cluster being equal to the number of the at least one speaker; a modeling module 840, for establishing a speaker classification model based on the selected at least one cluster; and an aligning module 850, for aligning, through the speaker classification model, speech frames in the audio stream to the at least one speaker.

In an implementation, the clustering module 820 may be further for: iteratively clustering the at least one speech segment into the plurality of clusters based on cosine similarity and/or BIC scores.

Moreover, the apparatus 800 may also comprise any other modules configured for speaker diarization with early-stop clustering according to the embodiments of the present disclosure as mentioned above.

Figure 9:
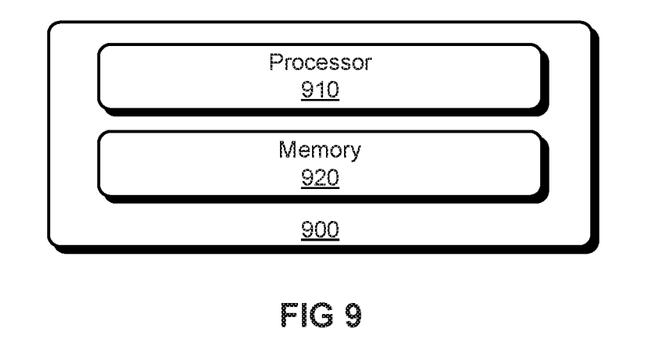
FIG. 9 illustrates an exemplary apparatus for speaker diarization according to an embodiment.

FIG. 9 illustrates an exemplary apparatus 900 for speaker diarization according to an embodiment.

The apparatus 900 may comprise at least one processor 910 and a memory 920 storing computer-executable instructions. When executing the computer-executable instructions, the at least one processor 910 may: segment an audio stream into at least one speech segment, the audio stream comprising speeches from at least one speaker; cluster the at least one speech segment into a plurality of clusters, the number of the plurality of clusters being greater than the number of the at least one speaker; select, from the plurality of clusters, at least one cluster of the highest similarity, the number of the selected at least one cluster being equal to the number of the at least one speaker; establish a speaker classification model based on the selected at least one cluster; and align, through the speaker classification model, speech frames in the audio stream to the at least one speaker. The at least one processor 910 may be further configured for performing any operations of the methods for speaker diarization with early-stop clustering according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for speaker diarization with early-stop clustering according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for speaker diarization, the method comprising:
   segmenting an audio stream into at least one speech segment, the audio stream comprising speeches from at least one speaker;
   initializing a dataset by the at least one speech segment, the dataset comprising at least one data item initialized by the at least one speech segment respectively;
   iteratively clustering the at least one data item into a plurality of clusters based on cosine similarity and Bayesian Information Criterion (BIC) scores among data items in the dataset, the number of the plurality of clusters being greater than the number of the at least one speaker;
   selecting, from the plurality of clusters, at least one cluster of the highest similarity, the number of the selected at least one cluster being equal to the number of the at least one speaker, wherein said selecting is performed by:
      calculating a similarity matrix of the plurality of clusters;
      exhaustively extracting a plurality of similarity sub-matrices from the similarity matrix, each similarity sub-matrix being a $M \times M$ matrix, M being the number of the at least one speaker;
      calculating an eigen vector of each similarity sub-matrix;
      obtaining an eigenvalue summation of each similarity sub-matrix through summating eigenvalues in an eigen vector of the similarity sub-matrix;
      identifying a similarity sub-matrix having the maximum eigenvalue summation from the plurality of similarity sub-matrices; and
      selecting a group of M clusters corresponding to the identified similarity sub-matrix;
   establishing a speaker classification model based on the selected at least one cluster; and
   aligning, through the speaker classification model, speech frames in the audio stream to the at least one speaker.

2. The method of claim 1, further comprising:
   determining whether the cosine similarity and/or the BIC scores meet predetermined criteria, the predetermined criteria being defined by at least one of a cosine similarity threshold, a BIC score threshold, and penalty weight used for calculating the BIC scores; and
   stopping the clustering if the cosine similarity and/or the BIC scores meet the predetermined criteria.

3. The method of claim 1, wherein cosine similarity is calculated based at least on d-vectors of two data items, and a BIC score is calculated based at least on Gaussian parameters of two data items.

4. The method of claim 1, wherein the iteratively clustering the at least one data item into the plurality of clusters comprises iteratively performing a series of operations including:
   calculating a BIC score of every two data items in the dataset;
   selecting two data items having the maximum BIC score in the dataset;
   determining whether the BIC score of the selected two data items meets a BIC score threshold; and
   if the BIC score threshold is met, merging the selected two data items into a new data item in the dataset, else if the BIC score threshold is not met, stopping performing the series of operations.

5. The method of claim 1, wherein the iteratively clustering the at least one data item into the plurality of clusters comprises iteratively performing a first series of operations including:
   calculating a d-vector for each data item in the dataset;
   calculating cosine similarity of every two data items in the dataset with d-vectors of the two data items;
   selecting two data items having the highest cosine similarity in the dataset;
   calculating a BIC score of the selected two data items;
   determining whether the cosine similarity and the BIC score of the selected two data items meet a cosine similarity threshold and a first BIC score threshold respectively; and
   if both the cosine similarity threshold and the first BIC score threshold are met, merging the selected two data items into a new data item in the dataset, else if the cosine similarity threshold and/or the first BIC score threshold are not met, stopping performing the first series of operations.

6. The method of claim 5, further comprising iteratively performing a second series of operations including:
   calculating a BIC score of every two data items in the dataset;
   selecting two data items having the maximum BIC score in the dataset;
   determining whether the BIC score of the selected two data items meets a second BIC score threshold; and
   if the second BIC score threshold is met, merging the selected two data items into a new data item in the dataset, else if the second BIC score threshold is not met, stopping performing the second series of operations.

7. The method of claim 4, wherein the BIC score is calculated based at least on a respective penalty weight.

8. The method of claim 1, wherein the selecting comprises:
   calculating a similarity metric of every group of M clusters among the plurality of clusters, M being the number of the at least one speaker; and
   selecting a group of M clusters having the maximum similarity metric.

9. The method of claim 1, wherein the speaker classification model is a hidden Markov model (HMM), and the establishing the speaker classification model comprises:
   establishing at least one Gaussian mixture model (GMM) with the selected at least one cluster respectively, each GMM corresponding to a speaker in the at least one speaker; and
   establishing the HMM with the at least one GMM, each state of the HMM being associated with a GMM in the at least one GMM.

10. The method of claim 9, further comprising:
   after aligning at least one speech frame in the audio stream to a first speaker in the at least one speaker, updating a GMM corresponding to the first speaker with the at least one speech frame; and
   updating the HMM with the updated GMM corresponding to the first speaker.

11. The method of claim 1, wherein the aligning comprises:
aligning each speech frame in the audio stream to a respective speaker in the at least one speaker; or
aligning each speech frame in at least one unselected cluster in the plurality of clusters to a respective speaker in the at least one speaker.

12. The method of claim 1, further comprising:
estimating the number of the at least one speaker based on the plurality of clusters.

13. The method of claim 12, wherein the estimating comprises:
calculating a second similarity matrix of the plurality of clusters;
obtaining a plurality of eigenvalues of the second similarity matrix through performing eigenvalue decomposition on the second similarity matrix;
sorting the plurality of eigenvalues in a descending order;
obtaining a quotient sequence through dividing every two successive eigenvalues in the sorted plurality of eigenvalues; and
determining the number of the at least one speaker through identifying an inflection point in the quotient sequence.

14. The method of claim 1, wherein the speech frames in the audio stream are represented by speaker bottleneck features.

15. The method of claim 14, further comprising, for each speech frame in the audio steam:
extracting a speaker acoustic feature of the speech frame; and
generating, through a neural network, a speaker bottleneck feature of the speech frame based on the speaker acoustic feature.

16. An apparatus for speaker diarization, the apparatus comprising:
a segmenting module, for segmenting an audio stream comprising speeches from at least one speaker into at least one speech segment;
a clustering module for iteratively clustering the at least one speech segment into a plurality of clusters based on cosine similarity and Bayesian Information Criterion (BIC) scores, the number of the plurality of clusters being greater than the number of the at least one speaker;
a selecting module, for selecting, from the plurality of clusters, at least one cluster of the highest similarity, the number of the selected at least one cluster being equal to the number of the at least one speaker, wherein the selecting is performed by:
calculating a similarity matrix of the plurality of clusters;
exhaustively extracting a plurality of similarity sub-matrices from the similarity matrix, each similarity sub-matrix being a $M \times M$ matrix, M being the number of the at least one speaker;
calculating an eigen vector of each similarity sub-matrix;
obtaining an eigenvalue summation of each similarity sub-matrix through summating eigenvalues in an eigen vector of the similarity sub-matrix;
identifying a similarity sub-matrix having the maximum eigenvalue summation from the plurality of similarity sub-matrices; and
selecting a group of M clusters corresponding to the identified similarity sub-matrix;
a modeling module, for establishing a speaker classification model based on the selected at least one cluster; and
an aligning module, for aligning, through the speaker classification model, speech frames in the audio stream to the at least one speaker.

17. An apparatus for speaker diarization, comprising:
at least one processor; and
a memory storing computer-executable instructions that, when executed, cause the at least one processor to:
segment an audio stream into at least one speech segment, the audio stream comprising speeches from at least one speaker;
iteratively cluster the at least one speech segment into a plurality of clusters based on cosine similarity and Bayesian Information Criterion (BIC) scores, the number of the plurality of clusters being greater than the number of the at least one speaker;
select, from the plurality of clusters, at least one cluster of the highest similarity, the number of the selected at least one cluster being equal to the number of the at least one speaker, by:
calculating a similarity matrix of the plurality of clusters;
exhaustively extracting a plurality of similarity sub-matrices from the similarity matrix, each similarity sub-matrix being a $M \times M$ matrix, M being the number of the at least one speaker;
calculating an eigen vector of each similarity sub-matrix;
obtaining an eigenvalue summation of each similarity sub-matrix through summating eigenvalues in an eigen vector of the similarity sub-matrix;
identifying a similarity sub-matrix having the maximum eigenvalue summation from the plurality of similarity sub-matrices; and
selecting a group of M clusters corresponding to the identified similarity sub-matrix;
establish a speaker classification model based on the selected at least one cluster; and
align, through the speaker classification model, speech frames in the audio stream to the at least one speaker.

* * * * *